No. 884,131.
M. D. COMPTON.
PATENTED APR. 7, 1908.
MOTOR DRIVEN EXHAUSTER AND COMPRESSOR.
APPLICATION FILED AUG. 29, 1905.
5 SHEETS—SHEET 1.
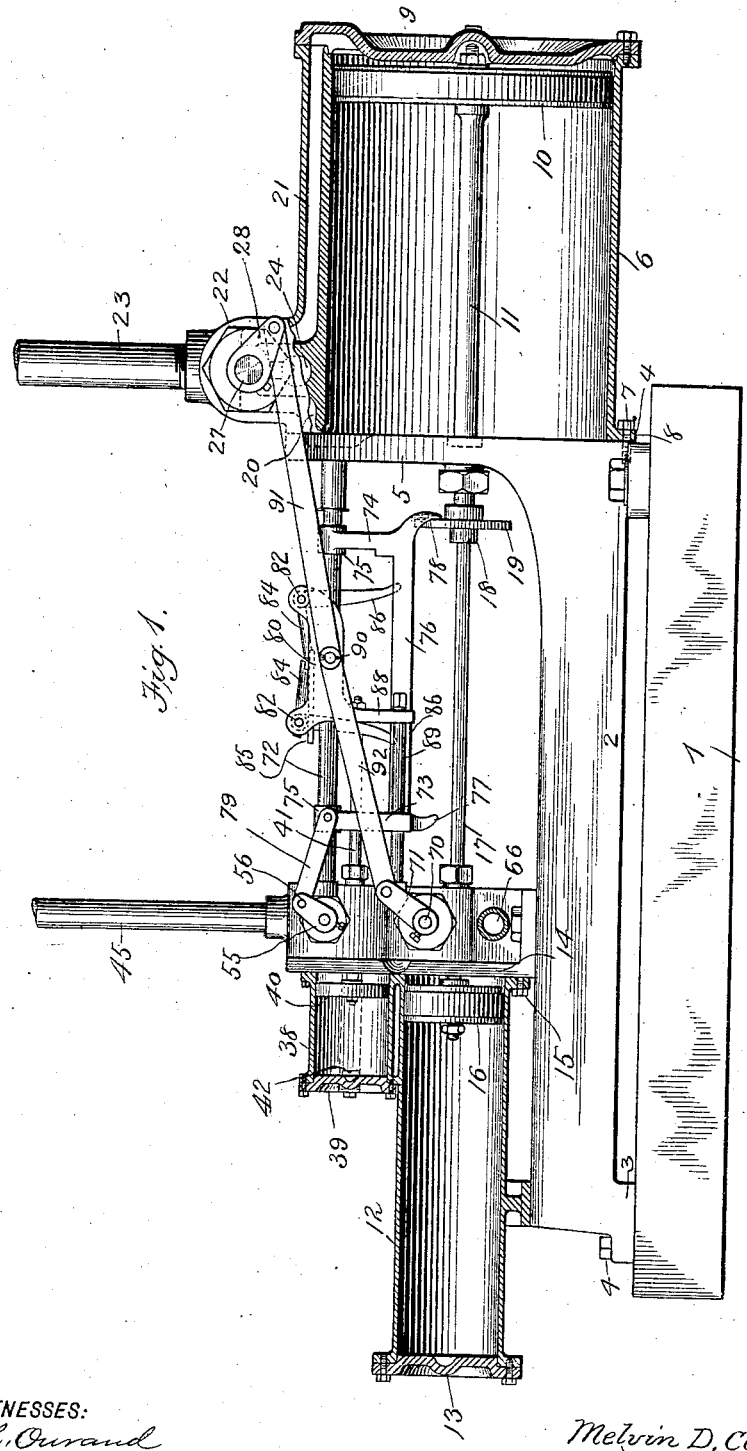
WITNESSES:
F. L. Ourand
W. H. Ourand
INVENTOR
Melvin D. Compton
BY ATTORNEY

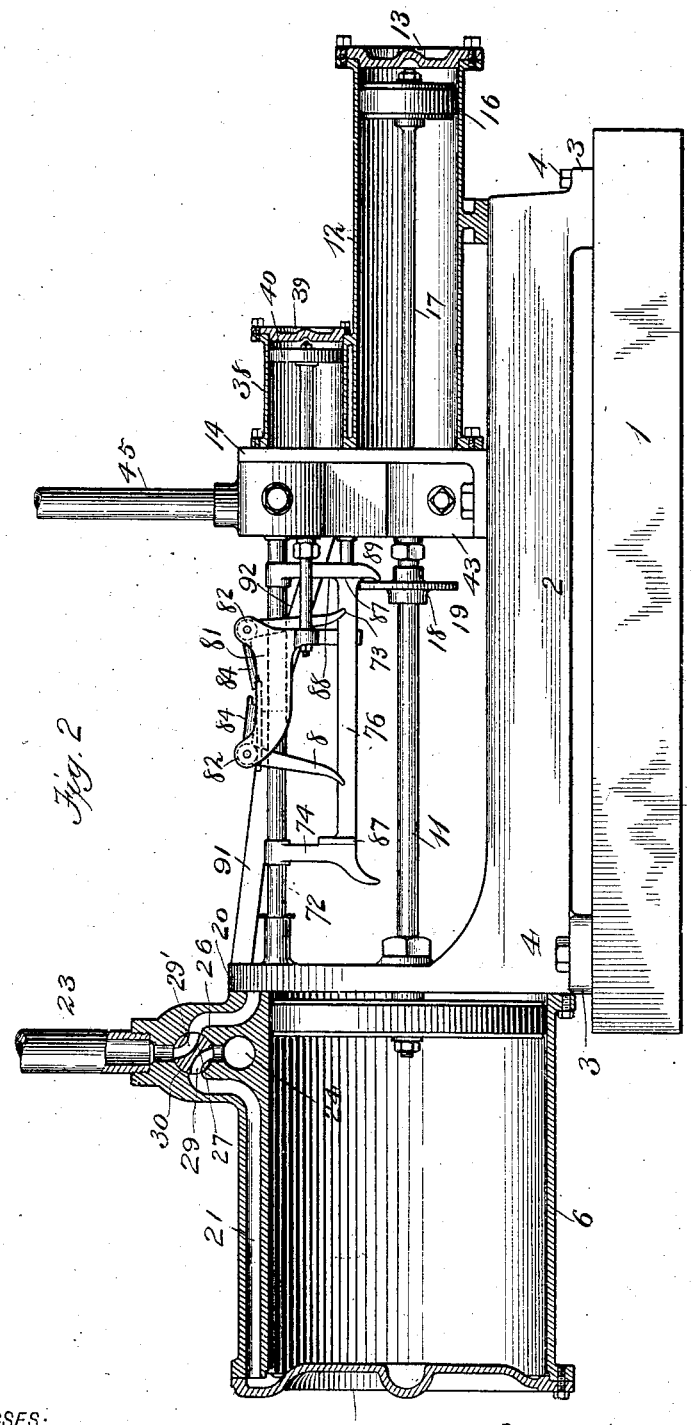

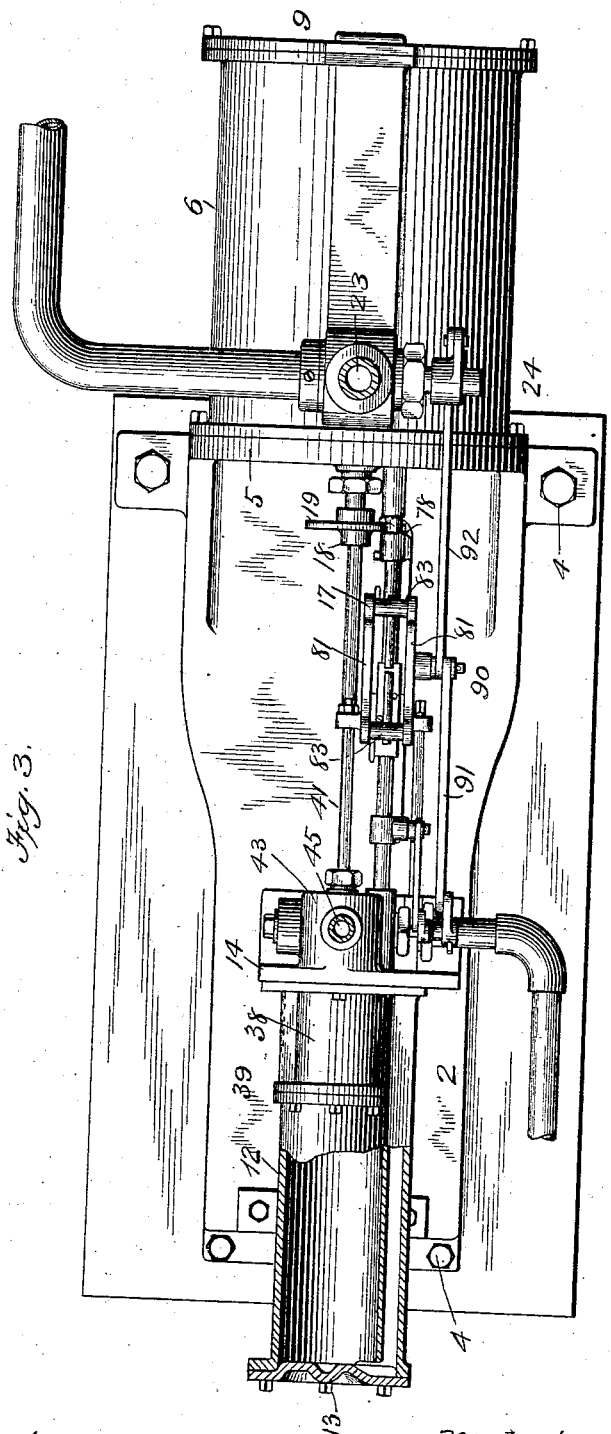

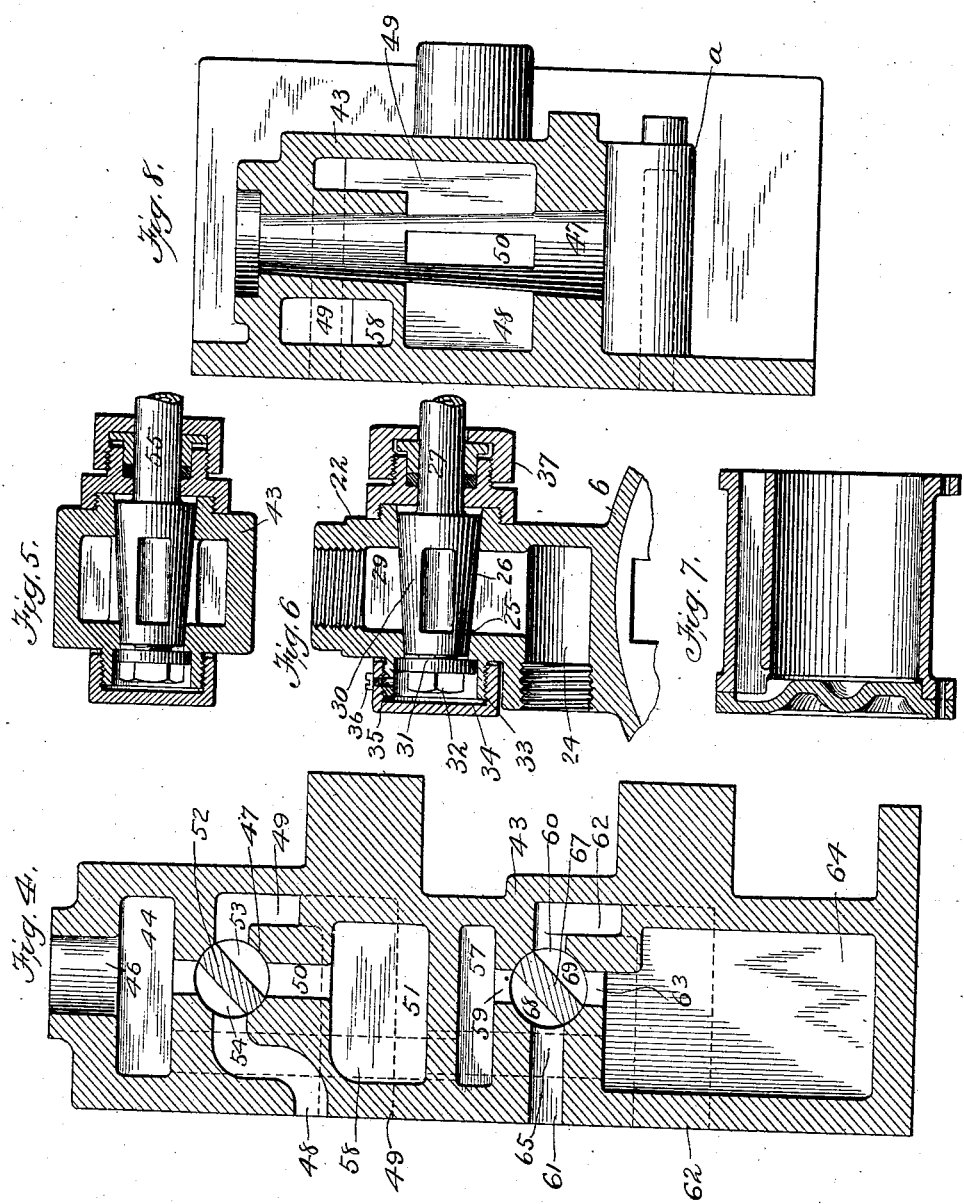

No. 884,131. PATENTED APR. 7, 1908.
M. D. COMPTON.
MOTOR DRIVEN EXHAUSTER AND COMPRESSOR.
APPLICATION FILED AUG. 29, 1905.
5 SHEETS—SHEET 5.
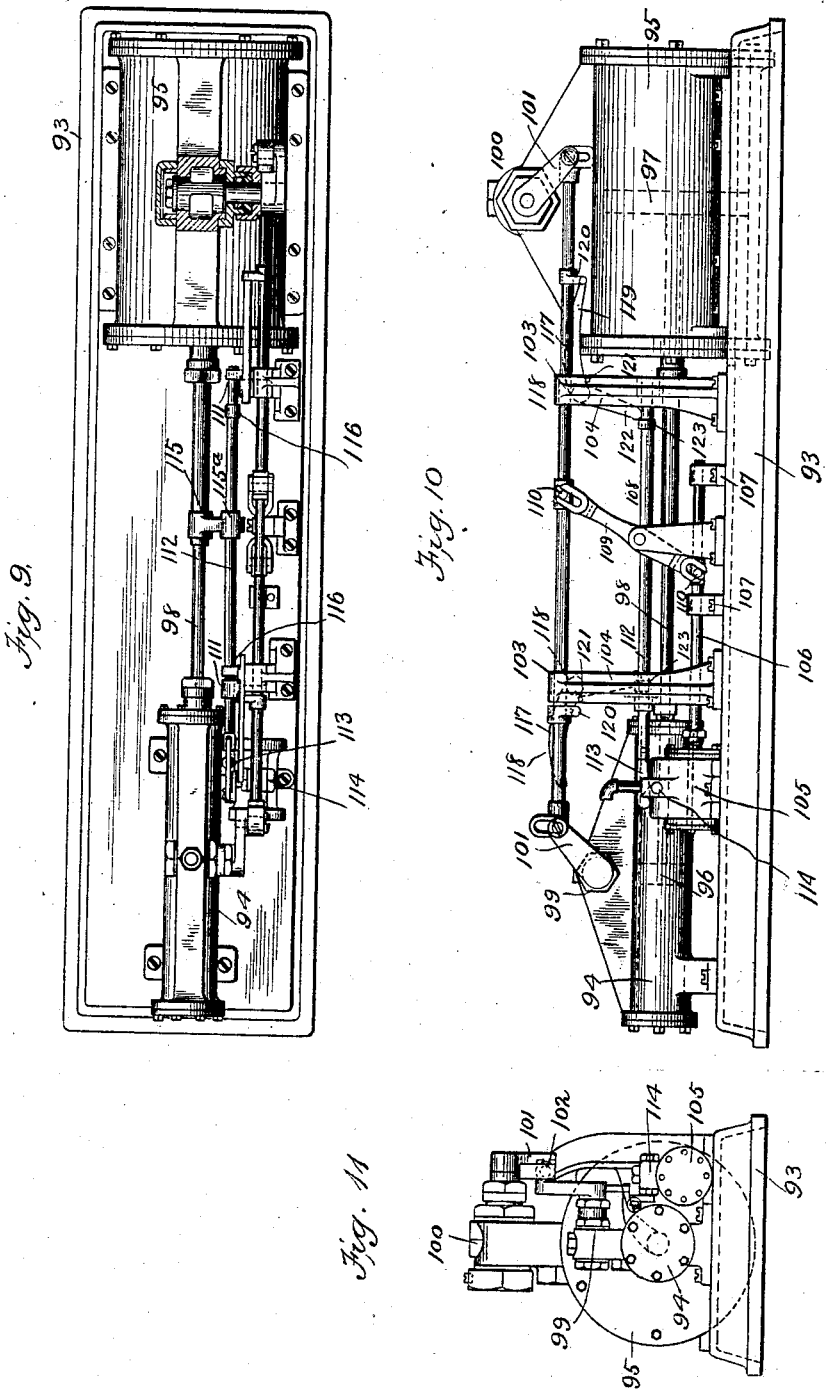
WITNESSES:
F. L. Ourand
W. H. Ourand
INVENTOR
Melvin D. Compton
BY ATTORNEY

UNITED STATES PATENT OFFICE.

MELVIN D. COMPTON, OF NEW YORK, N. Y., ASSIGNOR TO A. G. WHEELER, JR., TRUSTEE.

MOTOR-DRIVEN EXHAUSTER AND COMPRESSOR.

No. 884,131.   Specification of Letters Patent.   Patented April 7, 1908.

Application filed August 29, 1905. Serial No. 276,292.

To all whom it may concern:

Be it known that I, MELVIN D. COMPTON, a citizen of the United States, residing in the city, county, and State of New York, have invented certain new and useful Improvements in Motor-Driven Exhausters and Compressors, of which the following is a full, clear, and exact specification.

My invention has relation to new and useful improvements in air and gas exhausters or compressors, and particularly the type of machine forming the subject-matter of my U. S. Letters Patent No. 766,876, dated August 9, 1904. In my said Letters Patent is illustrated and described a machine embodying a compression cylinder and a fluid motor cylinder, each having a piston movable therein, which pistons are rigidly connected to each other by a piston rod common to both, the inlet and outlet ports or connection for said cylinders being controlled by valves positively held or locked in their operative positions to open or close the ports by detents actuated from the piston rod, said valves, when released from locked position, being simultaneously and quickly shifted to the opposite extreme position by springs which are brought to the proper tension by operative connection with the piston rod.

The primary object of the present invention is to provide an actuating means for the valves which will operate to quickly and positively shift the same and the efficiency of which will not be impaired by changes of temperature and continued use, vibration, or the position of the machine as a whole.

A further object of the invention is to provide a fluid actuated means for shifting the valves to the fluid cylinder and the compression cylinder, said fluid-actuated means being controlled by valves which are operated by the movement of the piston rod for the fluid motor and compression pistons.

A further object is to provide improved locking means for holding the valves for the fluid motor and compression cylinders in open or closed position, which locking means will be released by the piston rod at its limits of movement, and moved to locking position by the fluid-actuated means for throwing the valves.

A further object is to provide an apparatus the various elements of which will not be displaced or disturbed, owing to vibration, whereby the invention will be especially useful in use upon railway cars or on shipboard.

The invention consists broadly in a machine of the character set forth and for the purposes intended embodying a compression cylinder, a fluid motor to operate the piston of the compression cylinder, valve devices for admitting motive fluid to the fluid motor, and for controlling the flow of air, gas or liquid from or into the compression cylinder, fluid-actuated means for shifting said valves, means for locking the valves in the positions to which they are shifted, said shifting means being controlled in its operation by the movements of elements appurtenant to the fluid motor and the compression cylinders.

I have fully and clearly illustrated my invention in the accompanying drawings to be taken as a part of this specification and wherein:

Figure 1 is a view in side elevation, partly in section, of a machine embodying my present invention. Fig. 2 is a similar view to Fig. 1, but looking from the opposite side of the machine, the pistons and other elements shown in position opposite to that shown in Fig. 1. Fig. 3 is a plan view of the machine, the fluid motor cylinder being shown partly in section. Fig. 4 is a detail view in vertical central section of the valve casing for the valves which control the flow of motive fluid to the fluid motor and to the fluid-actuated means for shifting the several valves. Figs. 5 and 6 are detail views of the valves used in the fluid motor for shifting the valves. Fig. 7 is a detail sectional view through one end of the fluid motor cylinder. Fig. 8 is a detail transverse sectional view through the valve casing for one of the valves leading to either the fluid-actuator for the valve shifting devices, or the fluid motor cylinder. Figs. 9, 10 and 11 are, respectively, a plan view and views in side and end elevation of another form of the invention.

Referring to the drawings: 1 designates a base or foundation of any suitable character or construction upon which the frame of the apparatus is adapted to rest and be secured. The frame of the apparatus comprises a longitudinal base-plate 2, provided with feet or legs 3, which are rigidly secured to the base or foundation by means of bolts 4. At one end this base-plate is provided with a plate 5, disposed in a vertical plane, and which constitutes one head of a compression cylinder 6 disposed horizontally, said cylinder being rigidly connected to said vertical plate by bolts 7 let through openings in a flange 8 on said cylinder and engaging said plate. The end of the cylinder opposite to the plate 5 is closed by a head 9 of any approved construction and secured in position in any suitable manner. Within this cylinder 6 reciprocates a piston 10, carried by one end of a piston rod 11, the opposite end of which projects exterior to said cylinder, as clearly shown in the drawings.

Supported upon the base-plate at the end opposite to that upon which the compression cylinder is mounted is a fluid motor having connections with the piston rod 11 of the compression cylinder for reciprocating the piston 10. This fluid pressure motor, for the purposes of this application, is shown as being of the well known single piston rectilinear type, comprising a horizontally disposed cylinder 12, arranged in longitudinal axial alinement with the compression cylinder, said cylinder 12 being closed at one end by a head 13, and at its opposite end by a vertically disposed element 14, to which the cylinder is securely bolted as shown at 15. Within this fluid motor cylinder is arranged a reciprocating piston 16, carried by a rod 17, which extends exterior to the cylinder and is connected to the outer end of the piston 11 by a suitable coupling 18, which carries a striker consisting of an annular plate 19, the function of which will be fully set forth hereinafter, and by thus connecting the pistons it will be seen that any movement of the fluid motor piston will impart a corresponding movement to the piston of the compression cylinder.

The compression cylinder is provided with suitable ports and controlling means therefor whereby the piston compresses the gas or air and forces the same from said cylinder upon both directions of movement so that the pressure in the exit pipe is at all times maintained. To this end said cylinder 6 is formed in its wall with passages 20 and 21 which open, respectively, at one end into the opposite ends of the cylinder, said passages at their inner ends terminating in a valve chest 22, to the upper end of which is connected the inlet pipe 23 by means of which gas or liquid is fed to the compression cylinder, said valve chest being also provided with an exhaust or outlet passage 24 through which the contents of the cylinder are forced during the influence of the piston, said exhaust being located between the inner termination of the passages 20, 21. Within the valve chest above the exhaust 24 is formed a transversely extending conical valve seat 25, in which is rotatably mounted a turn-plug valve 26, one end of which is provided with an extension 27 located exterior to the valve chest and carrying at its end a crank arm 28, to which is connected a valve shifting means to be hereinafter described. The body of the turn-plug 27 is cut away on its sides to form oppositely disposed ports or passages 29, 29' separated by an imperforate wall 30. The opposite end of the valve from that carrying the extension 27 projects beyond the casing and is threaded as at 31 to receive a nut 32 by means of which the valve plug is secured in position, this end of the valve being housed within a chamber formed by an annular flange 33 on the valve chest. This flange is threaded as shown to receive a screw-cap 34. The walls of the cap and said flange are formed with registering openings, as at 35, through which a lubricant may be admitted to the chamber, to provide for the easy movement of the valve and to serve as a liquid seal, a screw 36 being provided to seal said openings. The end of the valve bearing the extension 27 is sealed by a suitable stuffing box and packing of any suitable construction, as shown at 37. It will be perceived that this valve may be rotated on its seat so as to bring the port 29 into register with the passage 21, and the outlet 24 and the port 29' into register with the gas inlet 23 and the passage 20, at which time the piston is located at the inner end of the cylinder and it is evident that upon the outward movement of the latter the gas in the cylinder ahead of the piston will be forced out through the passage 21, port 27 and outlet 24, while at the same time gas will be drawn into the cylinder behind the piston through the gas inlet 23, port 29' and passage 20. When the limit of outward movement of the piston is reached, the valve is rotated, by means to be hereinafter described, to bring the port 29 into register with the inlet 23 and passage 21, and the port 29' connects the passage 20 with the outlet 24, so that the inlet and outlet for the cylinder are reversed.

I will now proceed to describe the valve devices for controlling the flow of fluid to the motor cylinder and also the fluid-actuated means for operating the valves for the motor compression and fluid motor cylinder, together with the means for locking said valves in their operative positions.

Before entering into a detailed description of the fluid-actuated means for shifting or throwing the valves, I might state that generally it consists of a fluid motor the operation of which is controlled by valve mechanism, the latter being operated by means appurtenant to the compression cylinder, whereby, when the piston of the latter reaches a determined point in its stroke in either direction, said valve mechanism will be reversed so that said fluid motor will be rendered effective to instantly throw the valves to the compression cylinder and the fluid motor therefor so that the action thereof will be reversed. In the drawings this fluid-actuated detent 84, connected to that tail piece by way of the sleeve 83 upwards out of engagement with the plate 85, to permit the carriage to be moved along the rod 72.

The carriage 80 is provided with a depending member 88, which slidably engages a horizontally disposed guide rod 89 rigidly supported at one end on the valve chest 43, and this member 88 is connected to one end of the piston rod 41, so that each movement of the piston 40 imparts a corresponding movement to the carriage.

Projecting laterally from one side of the carriage 80 is a pivot pin 90, to which is connected one end of each of two connecting rods 91, 92, the opposite ends of which are connected, respectively, to the crank arm 28 on the valve 26, and arm 56 on the valve 52. By this arrangement it will be seen that the sliding movement of the carriage 80 operates to simultaneously shift the valves controlling the influent and effluent passages to the cylinders 6 and 12.

The operation of the invention as above described is as follows: As shown in Fig. 1 of the drawings, the piston 10 of the compressor has just reached the limit of its stroke and is ready to start on its return stroke, and the disk 19 has engaged the part 78 of the sliding frame, to move the latter to swing the valve 52 to admit fluid to the cylinder 38 to force the piston 40 to the position shown. The movement of the piston to the position shown serves to shift the carriage 80 toward the compression cylinder, and to swing the valves to the cylinder 6 and 12 simultaneously to admit fluid to the latter to force the piston 16 to the left, whereby the piston 10 is moved to the left and the air, gas or fluid forced from the cylinder 6. The parts being in the relative positions shown in Fig. 1, the piston 16 moves toward the outer end of the cylinder 12, carrying with it the piston 10 and the disk 19. This movement continues until said disk comes into engagement with the part 77, and the further movement of the piston 16 exerts a pull on the frame and slides the latter toward the fluid motor, which serves to swing the valve 52 on its seat to reverse the flow of motive fluid into the cylinder 38, to cause the piston 40 to reverse its movement. Simultaneously with the shifting of the valve 52, or very shortly previous thereto, the projection 87 on the hanger 74 strikes the tail piece 86 of the adjacent detent and lifts the latter out of engagement with the plate 85 which leaves the carriage 80 free to be moved.

When the valve 52 is shifted as just described, the reversed movement of the piston 40 pulls the carriage 80 toward the valve chest 43, and through the connecting rods 91, 92 simultaneously shifts the valves 52 and 28 to reverse the action of the fluid motor and compression cylinder. When the piston 40 reaches the end of its stroke, the detent opposite to that which has been just released drops into locking engagement with the plate 85, whereby the valves to the cylinders 12 and 6 are positively locked and held against movement until the movement of the disk 19 releases the carriage.

From the above description, taken in connection with the drawings, it will be seen that fluid-actuated means is provided, controlled in its operation by movements of the compressor, for quickly and positively shifting the valves, and it will be apparent that the shifting means acts quickly and efficiently without regard to the speed at which the fluid motor and compression pistons travel.

By the construction set forth a machine is provided which is efficient in use as an exhauster, as a compressor of gases, as a gas intensifier, as a hydraulic ram, a fuel feeding motor, etc., and in all these connections has been found in actual practice to attain the purpose for which it is constructed.

In Figs. 9, 10 and 11 is shown another form of machine embodying my invention, wherein a bed plate of the length of the machine is used, affording support for the outer ends of the cylinders. In this form a foundation 93 is provided upon which are mounted the fluid motor and compression cylinders 94, 95 having the pistons 96, 97 connected by a rod 98 common to both, said cylinders being provided with controlling valves 99, 100 to control the admission and exit of fluids or gas thereto. These valves are of substantially the same construction of the respective cylinder valves heretofore described, each being provided with a rocker arm 101, said arms being connected for simultaneous movement by means of a connecting rod 102, which reciprocates in guides 103 at the upper ends of rigidly mounted vertical posts 104.

105 designates the fluid cylinder for constituting the operating motor for the valves 99, 101, the piston rod 106 for said cylinder 105 extending exterior thereto and moving in guides 107. Located on the base 93 is post 108 upon which is fulcrumed a rocking lever 109, the respective ends of which engage pins 110 on the piston rods 106 and 102, whereby the reciprocation of the former imparts movement to the latter and to the valves 99 and 100.

Mounted in suitable guides 111 on the posts 103 is a reciprocating rod 112, which at one end has a link connection, as at 113, with the valve 114 of the cylinder 105.

Rigidly mounted upon the piston rod 98 to move therewith is an arm 115, the end of which is loosely sleeved on the valve rod 112, as at 115ª, the latter being provided adjacent its ends with collars 116, 116 which are adapted to be engaged by the sleeve 115ª at each limit of movement of the compressor means is shown as consisting of a horizontally disposed cylinder 38 mounted and secured in any suitable manner on the upper side of the cylinder 12, and closed at one end by a head 39, and at the other end by the port or element 14 heretofore referred to, to which the cylinder is secured by means of suitable bolts. Within this cylinder 38 reciprocates a piston 40 carried by a piston rod 41, one end of which extends from one end of said cylinder, the latter being provided with suitable ports 42 by means of which motive fluid may be fed alternately to both sides of said piston to move it in opposite directions.

Cast integral with the element 14 is a valve chest 43 which is provided with suitable ports and valves for conducting motive fluid, such as water, to the opposite ends of the main fluid motor cylinder and also to the piston cylinder 38. This valve chest 43 is formed with a pocket 44 into which water at suitable pressure, say, city pressure, is admitted through a pipe 45, said pocket communicating by way of a port 46 with a transversely disposed valve seat 47 from the opposite sides of which extend ports or passages 48, 49, respectively, which communicate with the ports to the cylinder 38, and arranged beneath the valve seat and in vertical alinement with the passage 46 is a waste way 50 which communicates with a waste chamber 51 formed in said valve chest 43. Rotatably mounted in the valve seat 47 is a turn-plug 52 formed with lateral ports or passage 53, 54, the arrangement being such that the ports 48, 49 may be alternately connected with the inlet 46 and the wasteway 50. By this arrangement of parts and the valve 52, it will be seen that motive fluid may be admitted to either side of the piston 40, according to which one of the passages 48, 49 connects with the inlet 46, to move the piston to accomplish a purpose to be presently set forth. The valve 52 is formed at one end with an extension 55 extending exterior to the valve chest and carrying an arm 56 by means of which connection is made to the valve shifting means.

Formed in the chest 43 below the waste chamber 51 is a pocket 57 into which the motive fluid is admitted through a passage 58 connecting said pocket with the chamber 44, said passage being shown in dotted lines in Fig. 4 and in Fig. 8. Leading from the pocket 57 is a port 59, which opens into a valve casing 60, from the opposite sides of which extend passages 61, 62 which connect, respectively, with the opposite ends of the cylinder 12, and also connecting with the valve casing is a port 63, which opens communication between the casing and a waste chamber 64, the latter being connected by a passage 65 with the waste chamber 51 heretofore mentioned, said lower chamber 64 being provided with an outlet 66 through which the waste water flows from the valve chest.

Mounted to rotate in the valve seat 60 is a turn-plug 67 having lateral ports 68, 69, which are arranged to establish communication between the ports 61, 62 and the passage 59, and said ports and the passage 63. This valve 67 is provided at one end with an extension 70, carrying a crank arm 71, to be connected to the valve shifting means. It will be seen that, when said valve is rotated, one of the ports 61, 62 will be connected with the passage 59 to permit motive fluid to pass into the cylinder 12, while the other port will be connected to the passage 63 whereby the inactive fluid in said cylinder may pass therefrom.

The means for operating the valves to the cylinders 6, 12 and 38 will now be described. Connected at its ends to the plate 5 and the valve chest 43 is a horizontal rod or member 72 upon which is slidably disposed a frame for movement lengthwise of said rod, said frame comprising hangers 73, 74 having their upper ends sleeved on said rod, as 75, the said hangers being connected adjacent their lower ends by a member 76 and formed with engaging portions 77, 78 which lie in the path of movement of the disk 19 carried by the piston rod 17. The disk 19 reciprocates in the space between the hangers 73, 74 and is adapted to alternately engage the same to slide the frame along the rod 72 at the limits of movement of the pistons. Pivotally connecting the frame and the arm 56 of the valve 52 is a link 79, and it will be seen that, when the piston in the compression cylinder reaches the end of the stroke the disk 19 will engage either one of the hangers 73, 74, according to the direction in which the piston is moving, and move the frame to shift the valve 52 to reverse the movement of the piston 40 in the cylinder 38. It will thus be seen that the valve for the cylinder 38 is positively actuated by means operated by the piston rod of the compressor.

Slidably mounted upon the rod 72 is a carriage 80, comprising oppositely arranged plates 81 connected at their ends in spaced relation by pins 82 Fig. 1, upon each of which pins is loosely mounted a sleeve 83 Fig. 3, each of said sleeves being formed with an inwardly extending detent 84 Fig. 2, the ends of said detent terminating said tail pieces 86. The tail pieces 86 are located in the path of movement of the sliding frame heretofore described and adapted to be respectively engaged by projections 87, on the ends of the sliding frame. It will be seen that, when one of the depending members 73, 74 is engaged by the disk 19, the projection 87 at the opposite end of the frame will engage the adjacent tail piece 86 and swing the piston, so as to shift the rod and consequently the valve 114 to the cylinder 105, to cause the movement of the piston therein to shift the lever 109 and reciprocate the valve rod 102, to reverse the valves of the fluid motor and compression cylinders. In this form of the invention the locking means for the valves comprises two detents 117, one of which is pivoted on each of the posts 104, as at 118, and each of these detents comprises an arm 119, the end of which is adapted to drop into the path of movement of a stop 120 carried at each end of the valve rod 102. The drop of the detents is limited by a pin 121 on the post 103.

Each of the detents is provided with a tail piece 122, which extends downwardly and is arranged to be engaged by a collar 123 on the valve rod 112 which serves to lift the arm 119 out of engagement with the stop 120. In this construction, when the piston 97 reaches the end of its stroke, the arm 115ᵃ strikes the collar 116, and shifts the valve rod 112 to reverse the valve 114. This movement of the valve rod pushes the collar 123 into engagement with the tail piece of the detent which serves to lift the arm 119 of the detent out of engagement with the stop 120, which releases the rod and permits the same, through connection with the piston rod 106 to be reciprocated. It will be understood that when the detent at one end of the rod 102 is operated to release the latter, the other detent becomes effective to lock the rod as soon as the shifting movement of the rod is completed.

Claims.

1. The combination of motor and compression cylinders with valve devices for controlling the inlets and outlets to said cylinders, a fluid cylinder the piston of which is connected to the said valve devices to move the same, a valve device to control the flow of motive fluid to said fluid cylinder, and means whereby said last named valve device is operated by the pistons to the motor and compression cylinders.

2. The combination of motor and compression cylinders with valve devices for controlling the inlets and outlets to said cylinders, a fluid cylinder the piston of which is connected to the said valve devices to move the same, a valve device to control the flow of motive fluid to said fluid cylinder, means whereby said last named valve device is operated by the pistons to the motor and compression cylinders, and means to lock all of the valves in their position.

3. The combination of motor and compression cylinders with valve devices for controlling the inlets and outlets to said cylinders, a fluid cylinder the piston of which is connected to the said valve devices to move the same, a valve device to control the flow of motive agent to the fluid cylinder, means whereby said last named valve device is operated by the pistons to the motor and compression cylinders, means to lock all of the valves in position, and means operable by the pistons of said cylinders to release the valves.

4. The combination of motor and compression cylinders with valve devices for controlling the inlets and outlets of said cylinders, a shifting carriage, means connecting the carriage and the valve devices whereby the latter are operated simultaneously, and a fluid motor for shifting said carriage to operate the valves, the controlling devices for the latter being operated by the pistons of the motor and compression cylinders.

5. The combination of motor and compression cylinders with valve devices for controlling the inlets and outlets of said cylinders, a shifting carriage, means connecting the carriage and the valve devices whereby the latter are operated simultaneously, a fluid motor for shifting said carriage to operate the valves, the controlling devices for the latter being operated by the pistons of the motor and compression cylinders, and means to lock the carriage against movement after the valves have been shifted.

6. The combination of motor and compression cylinders with valve devices for controlling the inlets and outlets of said cylinders, a shifting carriage, means connecting the carriage and the valve devices whereby the latter are operated simultaneously, a fluid motor for shifting said carriage to operate the valves, the controlling devices for said motor being operated by the pistons of the first named motor and the compression cylinders, means on the carriage to lock the same against movement, and means appurtenant to the pistons to release said locking means.

7. The combination of motor and compression cylinders with valve devices for controlling the inlets and outlets of said cylinders, a fluid motor to simultaneously actuate said valves, means to lock the valves in adjusted position, and means appurtenant to the motor and compression cylinders to operate the valves to the fluid motor cylinder, and to release the locking means at the end of the stroke of the pistons and the motor and compression cylinders.

8. The combination of motor and compression cylinders with valve devices for controlling the inlets and outlets of said cylinders, a fluid motor to simultaneously and instantaneously actuate said devices at the end of the stroke of the motor and compression cylinders, means to lock the devices in position, and means appurtenant to the motor and compression pistons to release said devices.

9. The combination of motor and compression cylinders with valve devices for controlling the inlets and outlets of said cylinders, a shifting carriage, a fluid motor to shift the carriage, means to connect the valve devices with the carriage whereby said valve devices are simultaneously operated when the carriage is shifted, a movable element having connection with the controlling valve of the fluid motor, and means appurtenant to the pistons of the motor and compression cylinders to move said element at the end of the stroke of said pistons whereby the fluid motor is operated to shift the carriage.

10. The combination of motor and compression cylinders with valve devices for controlling the inlets and outlets of said cylinders, a shifting carriage, a fluid motor to shift said carriage, means to connect the valves with the carriage whereby said valves are simultaneously operated when the carriage is shifted, means to lock the carriage in the positions to which it is shifted, a movable element having connection with the controlling valve of the fluid motor, and provided with means to engage the locking means to release the same, and means appurtenant to the pistons of the motor and compression cylinders to move said element at the end of the stroke of said pistons whereby the locking devices are operated to release the carriage and the fluid motor is operated to shift said carriage.

In testimony whereof, I have signed my name to this specification in the presence of two subscribing witnesses.

MELVIN D. COMPTON.

Witnesses:
C. L. HARDMAN,
A. G. WHEELER, Jr.